United States Patent
Ikeda et al.

(10) Patent No.: US 9,423,243 B1
(45) Date of Patent: Aug. 23, 2016

(54) STRAIN SENSOR AND METHOD OF MEASURING STRAIN AMOUNT

(71) Applicant: KONICA MINOLTA, INC., Chiyoda-ku, Tokyo (JP)

(72) Inventors: Kazuki Ikeda, Hachioji (JP); Takashi Kurosawa, Hachioji (JP); Hideo Uemura, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/015,230

(22) Filed: Feb. 4, 2016

(30) Foreign Application Priority Data

Feb. 26, 2015 (JP) ................................. 2015-036053

(51) Int. Cl.
*G01B 11/16* (2006.01)
*G01L 1/24* (2006.01)

(52) U.S. Cl.
CPC ................ *G01B 11/168* (2013.01); *G01L 1/24* (2013.01)

(58) Field of Classification Search
CPC ......... G01B 11/16; G01B 11/168; G01L 1/24
USPC .................................................. 356/32, 33
See application file for complete search history.

(56) References Cited

U.S. PATENT DOCUMENTS

| 2007/0146685 A1* | 6/2007 | Yoo ..................... G01B 11/2513 356/32 |
| 2015/0267107 A1* | 9/2015 | Zhu ........................... G01L 1/24 356/32 |

FOREIGN PATENT DOCUMENTS

| JP | 2009-264852 A | 11/2009 |
| JP | 2014-115220 A | 6/2014 |
| JP | 2014-178208 A | 9/2014 |
| JP | 2015-036650 A | 2/2015 |

* cited by examiner

*Primary Examiner* — Roy M Punnoose
(74) *Attorney, Agent, or Firm* — Buchanan Ingersoll & Rooney PC

(57) ABSTRACT

A strain sensor includes a light source, a marker which is disposed on a measuring object so that light from the light source is reflected by or transmitted through the marker, a detector which detects the intensity of the light from the marker, and a signal processor which calculates a strain amount based on the detected light intensity. The marker is a flat film including first and second media having different refractive indexes. The second medium is periodically arrayed in the first medium and exists simultaneously with the first medium on a plane parallel to the marker mounting surface. The maximum length of the second medium in a direction parallel to the mounting surface is shorter than the wavelength of the emitted light. The first and second media deform in response to load in a direction parallel to the mounting surface.

14 Claims, 4 Drawing Sheets

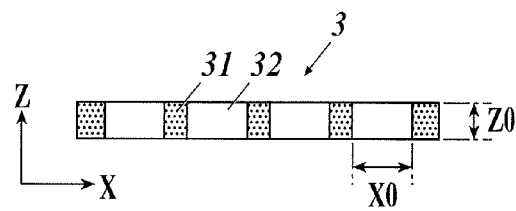
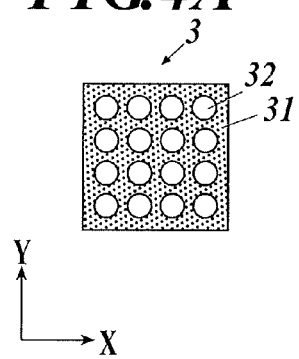
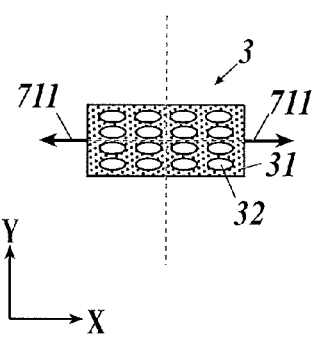
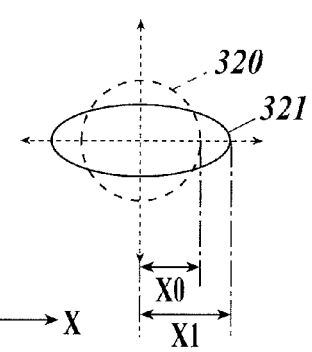
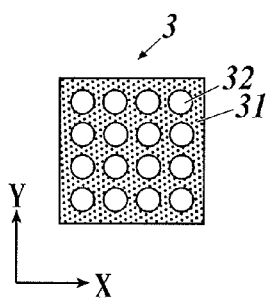
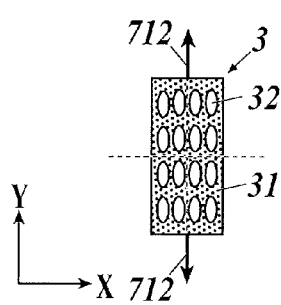
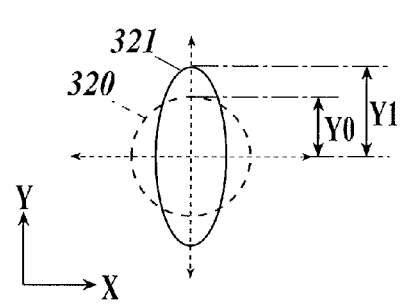
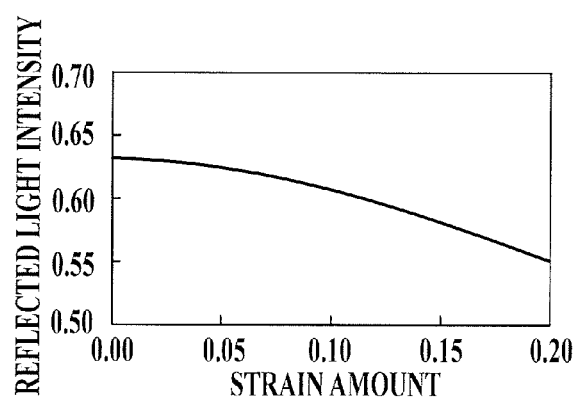

STRAIN SENSOR AND METHOD OF MEASURING STRAIN AMOUNT

BACKGROUND OF THE INVENTION

1. Field of the Invention

The present invention relates to a strain sensor and a method of measuring a strain amount.

2. Description of Related Art

Strain sensors have been used to measure various physical amounts that act on measuring objects, such as displacements, loads, and accelerations. Specifically, the strain sensors measure strains generated on measuring objects and convert the measured strains into physical amounts to determine the physical amounts.

Recently, there have been wishes, regarding the strain sensors, to measure strains generated on the whole structures for the purpose of monitoring of the structures. That is, attention has been riveted to strain sensors that can measure strain fields and can measure the strains generated on measuring objects at each area, rather than conventional strain sensors that measure strain points.

Disclosed is a strain sensor capable of measuring strain fields by measuring an amount of change in emission wavelength at each area using mechanoluminescent elements that vary in emission wavelength depending on strain amounts in response to an excitation light (see, for example, Japanese Unexamined Patent Application Publication No. 2014-115220).

Disclosed is measurement of strain fields using a moire method by attaching a marker having a grating pattern to a measuring object, photographing a displacement of the grating pattern in response to a load with a camera or the like, and comparing image data obtained before and after the application of the load (see, for example, Japanese Unexamined Patent Application Publication No. 2009-264852).

Unfortunately, measurements of strains with nanometer-scale displacements are difficult with the techniques of Japanese Unexamined Patent Application Publication Nos. 2014-115220 and 2009-264852.

Specifically, in order to measure strains with nanometer-scale displacements with the technique disclosed in Japanese Unexamined Patent Application Publication No. 2014-115220, it is necessary to measure picometer-scale variations in emission wavelength. However, it is very difficult to detect such small variations in emission wavelength with existing spectroscopes.

The technique disclosed in Japanese Unexamined Patent Application Publication No. 2009-264852 uses a camera to measure strains, and thus the accuracy of measurement of strains depends on the resolution of the camera. Considering the resolutions of existing cameras, in order to measure strains by overcoming noises, measurement of strains with micrometer-scale displacements is the limit, and it is difficult to measure strains with even smaller nanometer-scale displacements.

SUMMARY OF THE INVENTION

An object of the present invention, which has been made in view of the circumstances described above, is to provide a strain sensor and a method of measuring strain amounts that achieve measurement of strain amounts with nanometer-scale displacements.

To achieve the abovementioned object, a strain sensor reflecting one aspect of the present invention includes a light source which emits light; a marker which is disposed on a surface of a measuring object in such a way that the light emitted from the light source is reflected by or transmitted through the marker; a detector which detects a light intensity of the light reflected by or transmitted through the marker; a signal processor which calculates a strain amount based on the light intensity detected by the detector, wherein the marker is a flat film including a first medium and a second medium having different refractive indexes; the second medium is periodically arrayed in the first medium and exists simultaneously with the first medium on a plane parallel to a mounting surface on which the marker is disposed; a maximum length of the second medium in a direction parallel to the mounting surface is shorter than a wavelength of the light emitted from the light source; and the first medium and the second medium deform in response to a load in a direction parallel to the mounting surface.

Preferably, in the strain sensor, the light source emits a plurality of types of light each of which is polarized in a direction parallel to the mounting surface, the plurality of types of light having different polarization directions; the detector detects the polarization directions of the plurality of types of light reflected by or transmitted through the marker; and the signal processor determines a strain direction based on light intensities and the polarization directions detected by the detector.

Preferably, in the strain sensor, the light source emits first light polarized in the strain direction determined by the signal processor and emits second light polarized in a direction perpendicular to a polarization direction of the first light.

Preferably, in the strain sensor, the light source emits the plurality of types of light having the different polarization directions at different times.

Preferably, in the strain sensor, the light source includes a plurality of light sources; and the plurality of light sources emit the plurality of types of light having the different polarization directions.

Preferably, in the strain sensor, the signal processor calculates the strain amount based on table data indicating a correspondence relation between the light intensity and the strain amount, the table data being prepared for each of the polarization directions.

Preferably, in the strain sensor, the signal processor calculates the strain amount based on table data indicating a correspondence relation between the light intensity and the strain amount.

Preferably, in the strain sensor, each of areas for the second medium has a shape of a perfect circle in a planar view, the perfect circle having a central axis extending in a direction perpendicular to the mounting surface.

Preferably, in the strain sensor, the areas for the second medium contain gas.

Preferably, in the strain sensor, the light source and the detector are disposed adjacent to each other; and the light source emits the light in a direction substantially perpendicular to the mounting surface.

Preferably, in the strain sensor, each of the marker and the measuring object includes transparent substance; and the detector detects a spectral intensity of the light transmitted through the marker.

Preferably, the strain sensor further includes a temperature measurement section which measures temperatures of the marker and the measuring object, wherein the signal processor calculates Young's moduli of the marker and the measuring object based on the temperatures measured by the temperature measurement section.

Preferably, in the strain sensor, the light source emits a light beam having a wavelength of 1 μm or less.

A method of measuring a strain amount using the strain sensor reflecting another aspect of the present invention includes calculating the strain amount based on the light intensity detected by the detector.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is an example cross-sectional view taken along III-III of FIG. 2;

FIG. 4A is a plan view of the marker before a load in the X direction is applied to the marker;

FIG. 4B is a plan view of the marker being deformed in response to the load in the X direction;

FIG. 4C is a plan view showing a second medium before and after the load in the X direction is applied to the marker;

FIG. 5A is a plan view of the marker before a load in the Y direction is applied to the marker;

FIG. 5B is a plan view of the marker being deformed in response to the load in the Y direction;

FIG. 5C is a plan view showing a second medium before and after the load in the Y direction is applied to the marker;

FIG. 6 shows the correspondence relation between the strain amount and the reflected light intensity;

DESCRIPTION OF THE PREFERRED EMBODIMENTS

Figure 1:
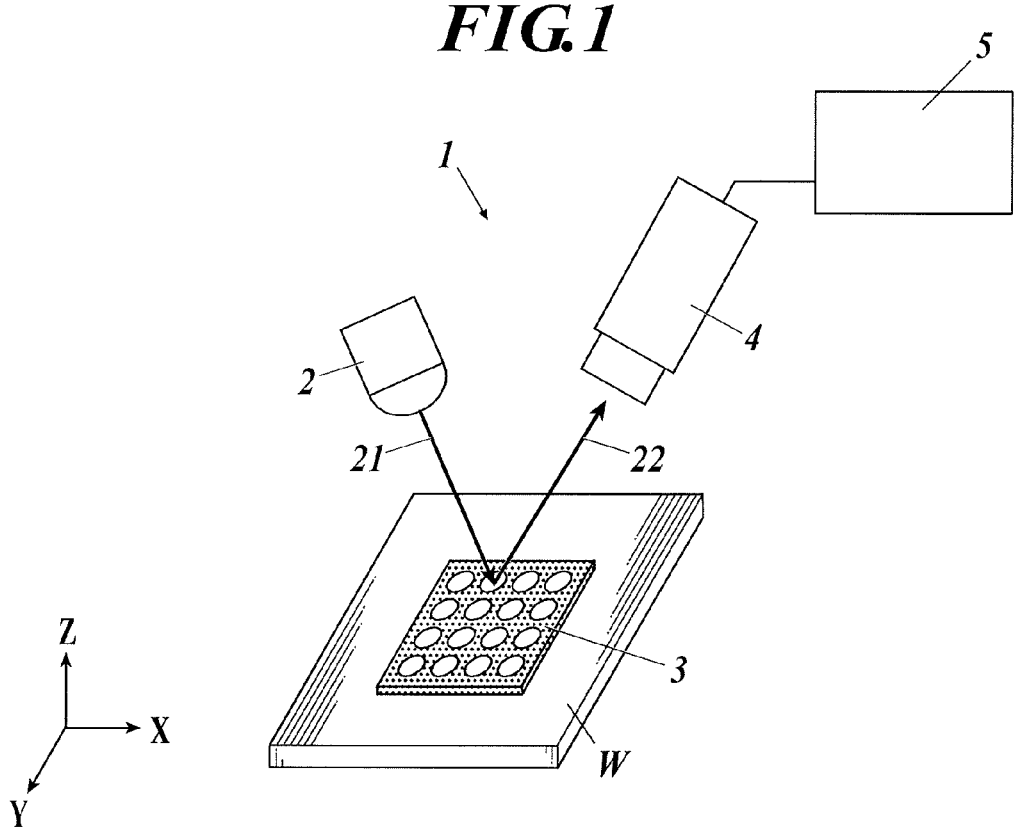
FIG. 1 shows an outline of a strain sensor according to an embodiment of the present invention.

Embodiments of the present invention will now be described in detail with reference to the drawings. In the following description, the right-left direction in FIG. 1 is referred to as X direction, the up-down direction in FIG. 1 is referred to as Z direction, and the direction perpendicular to the X and Z directions (i.e., the front-back direction) is referred to as Y direction.

A strain sensor 1 of this embodiment is a sensor that can optically measure strain fields generated on measuring objects W. As shown in FIG. 1, the strain sensor 1 includes a light source 2; a marker 3 to be fixed to the upper surface of a measuring object W disposed under the light source 2 in the Z direction in such a way that the marker 3 reflects the light from the light source 2; a detector 4 to be disposed over a measuring object W in the Z direction to detect the light reflected by the marker 3; and a signal processor 5 to measure strains of a measuring object W based on the light detected by the detector 4.

The light source 2 emits a non-polarizing light beam (incident light 21) toward the marker 3 that is fixed below. The light source 2 emits a light beam having a wavelength of 1 μm or less.

Figure 2:
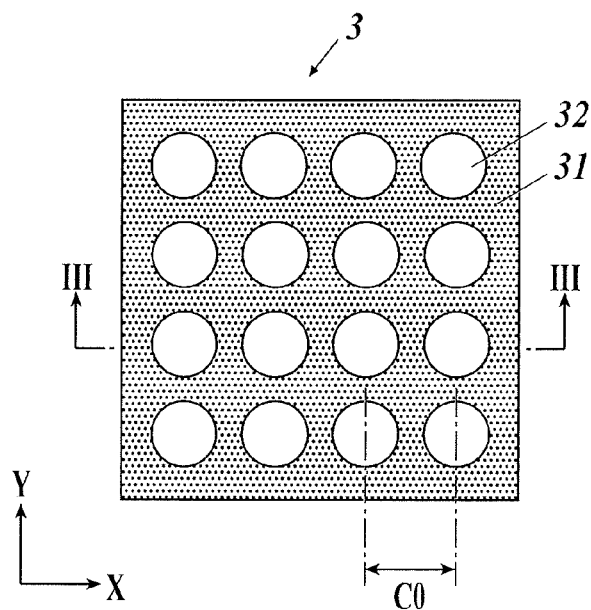
FIG. 2 is a plan view of a marker.

The marker 3 has a nanohole array structure having regularly-arrayed nanometer-scale uniform pores, the intensities of light reflected by which vary depending on amounts of strains generated in response to loads applied to the marker 3. As shown in FIGS. 2 and 3, the marker 3 is a flat film including a first medium 31 and a second medium 32 having different refractive indexes. The marker 3 reflects the light beam emitted from the light source 2.

The first medium 31 is a substantially square plate made of metal, such as aluminum, gold, silver, titanium, or titanium oxide, or resin. The first medium 31 has spaces in which the second medium 32 is disposed, each of the spaces having a shape of, in a planar view, a perfect circle with its central axis extending in the Z direction.

The second medium 32 is made of, for example, acrylic resin and is formed in the shapes of, in a planar view, perfect circles with their central axes extending in the Z direction. The second medium 32 has the same thickness as the first medium 31 and is periodically arrayed in the first medium 31. The semidiameter X0 of the second medium 32 is shorter than the peak wavelength of the light source 2.

As shown in FIGS. 4 and 5, the first medium 31 and the second medium 32 constituting the marker 3 deform in response to a load in a direction parallel to the fixation surface on which the marker 3 is fixed.

For example, as shown in FIGS. 4A and 4B, the marker 3 is displaced in the X direction in response to a load in the X direction (X load 711) applied to the marker 3. The strain amount $\epsilon x$ generated in the marker 3 in response to the X load 711 can be calculated with the mathematical expression (1): $\epsilon x=(X1-X0)/X0$, where X0 is the semidiameter of a second medium 320 before the application of the X load 711, and where X1 is the semidiameter of a second medium 321 after the application of the X load 711, as shown in FIG. 4C.

FIGS. 5A to 5C show that the marker 3 is displaced in the Y direction in response to a load in the Y direction (Y load 712) applied to the marker 3. The strain amount $\epsilon y$ generated in the marker 3 in response to the Y load 712 can be calculated with the mathematical expression (2): $\epsilon y=(Y1-Y0)/Y0$, where Y0 is the semidiameter of the second medium 320 before the application of the Y load 712, and where Y1 is the semidiameter of the second medium 321 after the application of the Y load 712, as shown in FIG. 5C.

The detector 4 detects the light intensity of the light beam (the reflected light 22) reflected by the marker 3. The intensity of the reflected light 22 detected by the detector 4 is outputted to the signal processor 5.

The signal processor 5 calculates the strain amount of a measuring object W based on the intensity of the reflected light 22 outputted from the detector 4. Specifically, the signal processor 5 calculates the strain amount based on the table data (see FIG. 6) that indicates the correspondence relation between the light intensity and the strain amount.

The method of calculating a strain amount, generated in the marker 3, by the strain sensor 1 according to this embodiment will now be described with reference to FIG. 6. The measurable range of the displacements depends on the wavelength of the light of the light source 2 and the semidiameter X0 of the second medium 32. Hence, setting the wavelength of the light of the light source 2 and the semidiameter X0 of the second medium on a nanometer scale enables measurement of strain amounts with nanometer-scale displacements. Of course, strain amounts can be measured also with micrometer-scale or larger displacements by appropriately setting the wavelength of the light of the light source 2, the size of the structure, the materials, and the like.

Examples

The marker 3 used in an example had a first medium 31 and a second medium 32. The first medium 31 had a thickness Z0 of 200 nm. The second medium 32 had a semidiameter X0 of 200 nm and was disposed at intervals C0 of 300 nm. The first medium 31 was made of aluminum (Al), and the second medium 32 was made of silicon dioxide ($SiO^2$). The light source 2 was a light source to emit non-polarized light having a peak wavelength of about 700 nm.

FIG. 6 shows table data indicating the correspondence relation between the strain amount $\epsilon$ and the reflected light intensity. The reflected light intensity is calculated by "(the light quantity of the reflected light 22)÷(the light quantity of the incident light 21)". In the example, the reflected light intensity monotonically decreases with an increase in applied load (an increase in strain amount s) as shown in FIG. 6. This is because a load applied to the marker 3 deforms the second medium 32 included in the marker 3 and changes the characteristics of the surface plasmon generating on the surface of the marker 3.

The table data shown in FIG. 6 prepared in the signal processor 5 enables calculation of the strain amounts $\epsilon$ generated in the marker 3 based on the reflected light intensities detected by the detector 4. For example, if a reflected light intensity detected by the detector 4 is 0.60, the strain amount $\epsilon$ ($\approx 0.10$) corresponding to the reflected light intensity of 0.60 can be obtained in reference to the table data shown in FIG. 6.

As described above, the strain sensor 1 according to this embodiment includes the light source 2 which emits light, the marker 3 to be fixed to the surface of a measuring object W to reflect the light from the light source 2, the detector 4 which detects the intensity of the light reflected by the marker 3, and the signal processor 5 which calculates the strain amount based on the intensity of the light detected by the detector 4. The marker 3 is a flat film including the first medium 31 and the second medium 32 having different refractive indexes. The second medium 32 has the same thickness as the first medium 31 and is periodically arrayed in the first medium 31. The maximum length of the second medium 32 in a direction parallel to the fixation surface, on which the marker 3 is fixed, is shorter than the wavelength of the light emitted from the light source 2. The first medium 31 and the second medium 32 deform in response to the load in a direction parallel to the fixation surface on which the marker 3 is fixed.

According to the strain sensor 1 of this embodiment, the wavelength of the light of the light source 2 and the semidiameter of the second medium 32 are determined on a nanometer scale (for example, the strain sensor 1 has a nanohole array structure with regularly-arrayed nanometer-scale uniform pores on the device surface). This enables determination of the measurable range of the displacements on a nanometer scale and thus enables measurement of strain amounts with nanometer-scale displacements.

Further, according to the strain sensor 1 of this embodiment, the signal processor 5 calculates strain amounts based on the table data indicating the correspondence relation between the light intensity and the strain amount. This reduces environmental errors and manufacturing errors, leading to enhancement in detection accuracy of strain amounts.

Further, according to the strain sensor 1 of this embodiment, each of the areas for the second medium 32 has, in a planar view, a shape of a perfect circle with its central axis extending in the direction perpendicular to the fixation surface on which the marker 3 is fixed. This allows the strain sensor 1 to have constant sensitivity to strains in all directions on the plane and facilitates the detection of strain amounts.

Further, according to the strain sensor 1 of this embodiment, the light source 2 emits a light beam having a wavelength of 1 μm or less. This enables determination of the measurable range of the displacements on a nanometer scale and thus enables accurate measurement of strain amounts with nanometer-scale displacements.

Further, if the light wavelength of the light source 2 of the strain sensor 1 according to this embodiment is set to 1 μm or more, the measurable range of the displacements can be determined on a micrometer scale and thus accurate measurement of strain amounts with micrometer-scale displacements can be achieved.

The present invention is not limited to the embodiment described above in detail and can be modified without departing from the spirit of the present invention.

(Modification)

A strain sensor 1A according to a modification is different from the strain sensor 1 of the embodiment in the configurations of a light source 2A, a detector 4A, and a signal processor 5A as shown in FIGS. 7 to 10. The same numerals and alphabets are assigned to the same configurations as those of the embodiment and the detailed explanations for such configurations are omitted for simplicity.

Figure 7:
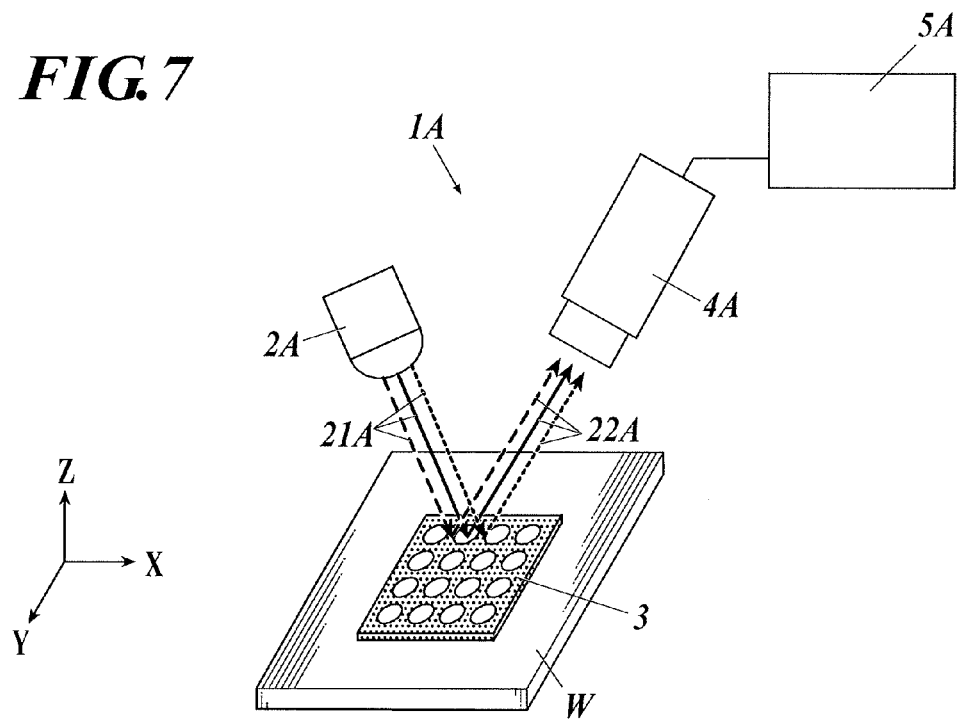
FIG. 7 shows an outline of a strain sensor according to a modification of the present invention.

As shown in FIG. 7, the light source 2A emits linearly-polarized light beams (incident light 21A) toward a marker 3 fixed below.

The detector 4A detects the light intensities and the polarization directions of the light beams (the reflected light 22A) reflected by the marker 3.

The signal processor 5A determines (calculates) the strain direction and the strain amount of a measuring object W based on the intensities and polarization directions of the reflected light 22A outputted from the detector 4A. Specifically, the signal processor 5A determines the polarization direction having the maximum light intensity as the strain direction of the measuring object W, based on the light intensities and the polarization directions of the reflected light 22A outputted from the detector 4A. The signal processor 5A then calculates the strain amount based on table data (see FIG. 10) that indicates the correspondence relation between the light intensity and the strain amount for the determined strain direction.

The method of calculating a strain amount, generated in the marker 3, by the strain sensor 1A according to the modification will now be described with reference to FIGS. 8 to 10.

The marker 3 used in the modification had a first medium 31 and a second medium 32. The first medium 31 had a thickness Z0 of 200 nm. The second medium 32 had a semidiameter X0 of 200 nm and was disposed at intervals C0 of 300 nm. The first medium 31 was made of aluminum (Al), and the second medium 32 was made of silicon dioxide ($SiO^2$). The light source 2A was a light source to emit linearly-polarized light having a peak wavelength of about 700 nm. In the modification, the light source 2A emitted multiple types of light having different polarization directions at different times, and the light intensities of the polarization directions were measured.

Figure 8:
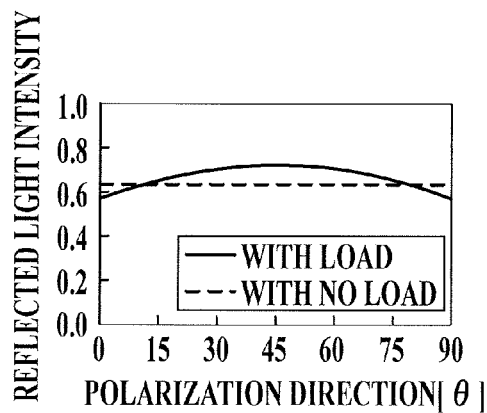
FIG. 8 shows reflected light intensities with respect to the polarization directions.
Figure 9:
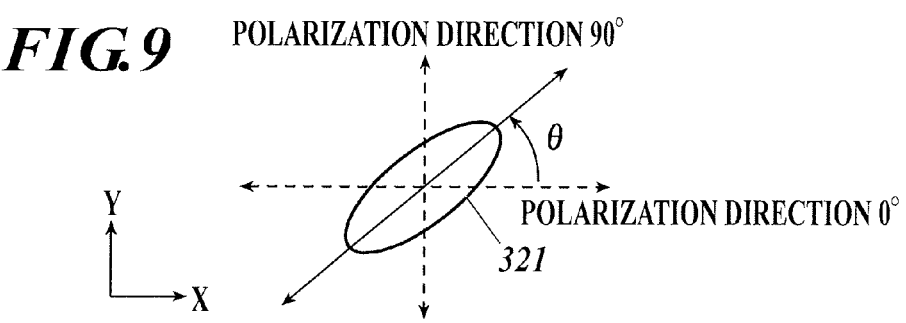
FIG. 9 shows the strain direction of a second medium and the polarization direction.

FIG. 8 shows a graph of reflected light intensities with respect to the respective polarization directions $\theta$. As shown in FIG. 9, a polarization direction $\theta$ refers to the angle by which light is polarized from the X direction on the X-Y plane. As shown in FIG. 8, when a single-axis load is applied in any direction on the X-Y plane, the intensity of light reflected by the marker 3 varies depending on the polarization direction. This is because the load causes deformation of the second medium 32 from a perfect circle shape to an ellipse shape and the semidiameter of the second medium 32 varies depending on the polarization direction, leading to variation in characteristics of the surface plasmon generated on the surface of the marker 3. Under the conditions of the modification, the reflected light intensity increases with an increase in semidiameter of the second medium 32. Specifically, the strain direction of a measuring object W is the direction that maximizes the semidiameter of the second medium 32, and the direction that maximizes the semidiameter of the second medium 32 is the polarization direction that has the maximum reflected light intensity. Specifically, for example, as shown in FIG. 8, when the reflected light intensities show the characteristics indicating that a load is applied, the polarization direction $\theta$ that maximizes the reflected light intensity is 45°, and thus the strain direction is determined to be 45°.

Figure 10:
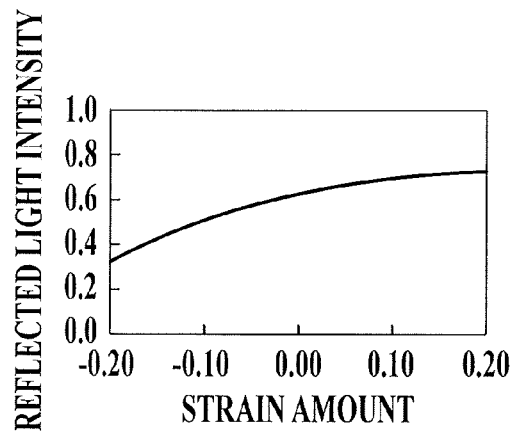
FIG. 10 shows the correspondence relation between the strain amount and the reflected light intensity.

FIG. 10 shows table data that indicates the correspondence relation between the strain amount and the reflected light intensity. The table data shown in FIG. 10 is prepared for each polarization direction (strain direction) in the signal processor 5A, thereby allowing calculation of the strain amount $\epsilon$ generated in the marker 3, based on the reflected light intensities and the polarization directions detected by the detector 4A. For example, when light polarized in a polarization direction $\theta$ is emitted to the marker 3 and the detector 4A detects the reflected light having an intensity of 0.70, the strain amount $\epsilon$ ($\approx 0.10$) can be obtained corresponding to the reflected light having an intensity of 0.70 by reference to the table data of the polarization direction $\theta$ shown in FIG. 10.

As described above, the strain sensor 1A according to the modification includes the light source 2A, the detector 4A, and the signal processor 5A. The light source 2A emits multiple types of light, each of which is polarized in a direction parallel to the fixation surface on which the marker 3 is fixed. The multiple types of light have different polarization directions. The detector 4A detects the polarization directions of the light reflected by the marker 3. The signal processor 5A determines the strain direction based on the intensities and polarization directions of the light detected by the detector 4A.

The strain sensor 1A according to the modification thus can detect the reflected light intensities of multiple polarization directions and can determine the direction having the maximum strain (maximum-strain direction) based on the differences in reflected light intensities of the polarization directions. Further, the strain amount of the maximum-strain direction can be determined based on the light intensity of the determined maximum-strain direction.

Further, according to the strain sensor 1A of the modification, the light source 2A emits multiple types of light having different polarization directions at different times. Accordingly, only a single light source 2A can measure the light intensities of the polarization directions, leading to reductions in sizes of the light source 2A and the detector 4A and reduction in cost.

Further, according to the strain sensor 1A of the modification, the signal processor 5A calculates a strain amount based on the table data indicating the correspondence relation between the light intensity and the strain amount, the table data being prepared for each polarization direction. This reduces environmental errors and manufacturing errors, leading to enhancement in detection accuracy of strain amounts.

In the modification, a strain amount is calculated based on the table data (see FIG. 10) indicating the correspondence relation between the light intensity and the strain amount. The present invention, however, is not limited to this. For example, the strain amount may be calculated with a predetermined computational expression(s) based on the light intensity detected by the detector 4A.

Further, in the modification, the signal processor 5A determines a strain direction based on the intensities and polarization directions of the light detected by the detector 4A. The present invention, however, is not limited to this. For example, after the signal processor 5A determines the strain direction, the light source 2A may emit first light polarized in the determined strain direction and second light polarized in the direction perpendicular to the polarization direction of the first light.

Such a configuration enables calculation of the length of the major axis of the ellipse of the second medium 32 in a planar view (i.e., the strain amount in the strain direction), calculation of the length of the minor axis of the ellipse (i.e., the strain amount in the direction perpendicular to the strain direction), and calculation of the rotation angle $\theta$. This enables measurements of the strain degrees in the entire marker 3.

Figure 11:
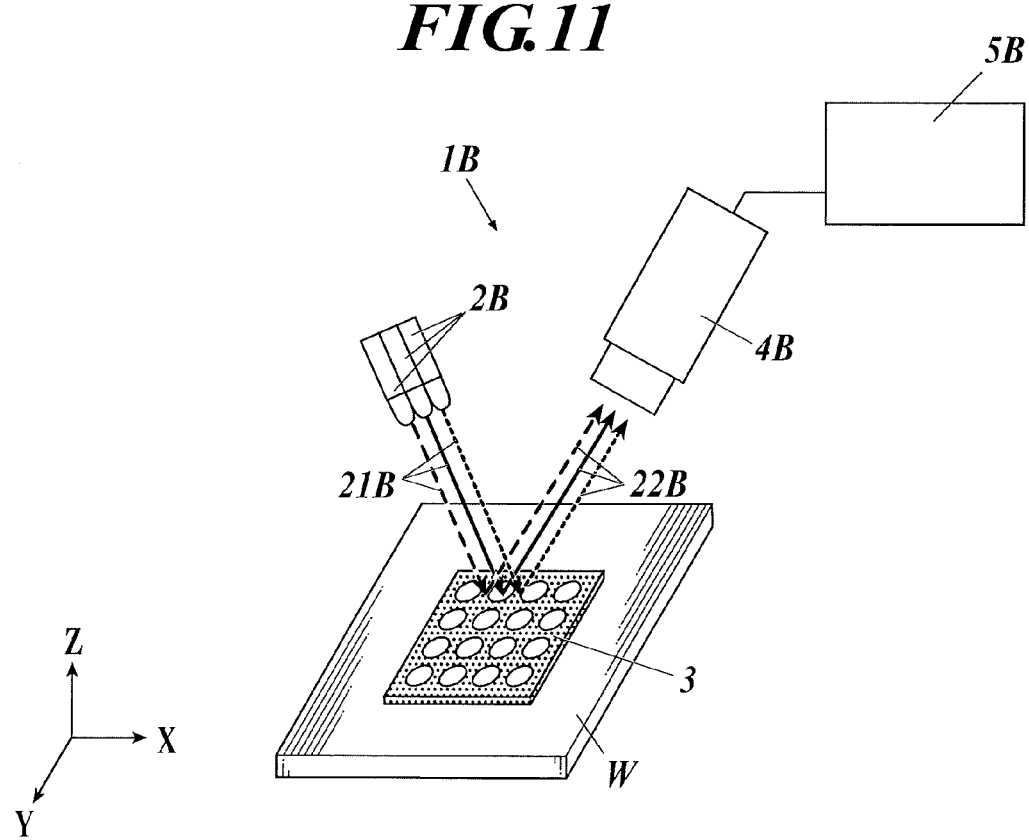
FIG. 11 shows an outline of a strain sensor having multiple light sources.

Further, in the modification, a single light source 2A emits multiple types of light having different polarization directions at different times. The present invention, however, is not limited to this. For example, the strain sensor is like a strain sensor 1B shown in FIG. 11 having multiple light sources 2B. The light sources 2B may emit multiple types of light (incident light 21B) having different polarization directions.

In this case, a detector 4B detects the intensities and polarization directions of the light beams (reflected light 22B) reflected by the marker 3. A signal processor 5B determines the strain direction and strain amount of a measuring object W based on the intensities and polarization directions of the reflected light 22B outputted from the detector 4B.

Such a configuration enables emission of multiple light beams having different polarization directions to the marker 3. Accordingly, a large amount of data can be obtained by a single measurement, leading to enhancement in detection accuracy of a strain direction and strain amount. Further, the configuration allows determination of a strain direction and strain amount with a single measurement and thus can reduce the measurement time.

(Other Modifications)

In the embodiment described above, a strain amount is calculated based on the table data (see FIG. 6) that indicates the correspondence relation between the light intensity and the strain amount. The present invention, however, is not limited to this. For example, the strain amount may be calculated with a predetermined computational expression(s) based on the light intensity detected by the detector 4.

Further, in the embodiment described above, each of the areas for the second medium 32 has, in a planar view, a shape of a perfect circle with its central axis extending in the Z direction (i.e., the direction perpendicular to the fixation surface on which the marker 3 is fixed). The present invention, however, is not limited to this. The areas for the second medium 32 may have any shape that has the maximum length, in a direction parallel to the fixation surface on which the marker 3 is fixed, shorter than the wavelength of the light emitted from the light source 2. For example, each of the areas for the second medium 32 may have a shape of an ellipse or a rectangle.

Further, in the embodiment described above, the second medium 32 is made of acrylic resin. The present invention, however, is not limited to this. For example, gas may be contained in the areas for the second medium 32. In this case, any gas may be hermetically-sealed or the areas for the second medium 32 may be empty spaces where air is present to serve as the second medium 32.

Containing gas in the areas as the second medium 32 avoids the presence of the gaps between the first medium 31 and the second medium 32 when a displacement is generated on the marker 3. Further, containing gas in the areas as the second medium 32 reduces the stresses that are generated due to the difference in thermal expansion between the first medium 31 and the second medium 32 when the temperature of the marker 3 rises. Such a configuration further enhances detection accuracy of strain amounts.

Further, in the embodiment described above, the detector 4 is disposed separately from the light source 2 as shown in FIG. 1. The present invention, however, is not limited to this. The light source 2 and the detector 4 may be disposed to be adjacent to each other, and the light source 2 may emit light in the direction substantially perpendicular to the fixation surface on which the marker 3 is fixed.

According to such a configuration, the light beam is incident on the marker 3 substantially perpendicular to the marker 3. This minimizes the variation in intensity of spectral components of the light beam due to the differences in angle of incidence, ensuring stability in detection accuracy of strain amounts.

Further, in the embodiment described above, the light beam emitted from the light source 2 is reflected by the marker 3. The present invention, however, is not limited to this. For example, each of the marker 3 and the measuring object W may be made of transparent substance, and the light beam emitted from the light source 2 may be transmitted through the marker 3 and the measuring object W. In this case, the detector 4 is disposed at a location to which the light beam from the light source 2 is to travels through the marker 3 and the measuring object W, so as to detect the spectral intensity of the light transmitted through the marker 3.

Such a configuration enables measurement of a strain amount using the light transmitted through the marker 3 and the measuring object W, leading to further enhancement in detection accuracy compared to the measurement with reflected light.

Further, a temperature measurement section may be provided to measure the temperatures of the marker 3 and the measuring object W, and the signal processor 5 may calculate the Young's moduli of the marker 3 and the measuring object W based on the temperatures measured by the temperature measurement section.

Such a configuration enables measurement values to be corrected based on the calculated Young's moduli, leading to further enhancement in detection accuracy of strain amounts. The configuration enables the calculation of not only the strain amounts but also the stresses generated by loads.

Further, in the embodiment described above, the marker 3 is fixed to the surface of a measuring object W. The present invention, however, is not limited to this. While it is preferred that the marker 3 be fixed to the surface of a measuring object W with, for example, an adhesive, the maker 3 may be put on the surface of a measuring object W in any way. For example, the maker 3 may be placed on the surface of a measuring object W without being fixed thereto.

Further, in the embodiment described above, the second medium 32 has the same thickness as that of the first medium 31. The present invention, however, is not limited to this. The first and second media 31 and 32 do not necessarily have to have the same thickness as long as the second medium 32 exists simultaneously with the first medium 31 on the plane parallel to the mounting surface on which the marker 3 is disposed. For example, the second medium 32 may have a thickness smaller than that of the first medium 31.

The detailed configurations and operations of the components of the strain sensors can be modified as appropriate without departing from the spirit of the present invention.

The strain sensors according to the embodiment and modifications described above achieve measurement of strain amounts with nanometer-scale displacements.

The entire disclosure of Japanese Patent Application No. 2015-036053 filed on Feb. 26, 2015 including description, claims, drawings, and abstract are incorporated herein by reference in its entirety.

Although various exemplary embodiments have been shown and described, the present invention is not limited to the embodiments shown. Therefore, the scope of the present invention is intended to be limited solely by the scope of the claims that follow.

What is claimed is:

1. A strain sensor comprising:
   a light source which emits light;
   a marker which is disposed on a surface of a measuring object in such a way that the light emitted from the light source is reflected by or transmitted through the marker;
   a detector which detects a light intensity of the light reflected by or transmitted through the marker;
   a signal processor which calculates a strain amount based on the light intensity detected by the detector, wherein
   the marker is a flat film comprising a first medium and a second medium having different refractive indexes;
   the second medium is periodically arrayed in the first medium and exists simultaneously with the first medium on a plane parallel to a mounting surface on which the marker is disposed;
   a maximum length of the second medium in a direction parallel to the mounting surface is shorter than a wavelength of the light emitted from the light source; and
   the first medium and the second medium deform in response to a load in a direction parallel to the mounting surface.

2. The strain sensor according to claim 1, wherein
   the light source emits a plurality of types of light each of which is polarized in a direction parallel to the mounting surface, the plurality of types of light having different polarization directions;
   the detector detects the polarization directions of the plurality of types of light reflected by or transmitted through the marker; and
   the signal processor determines a strain direction based on light intensities and the polarization directions detected by the detector.

3. The strain sensor according to claim 2, wherein
   the light source emits first light polarized in the strain direction determined by the signal processor and emits second light polarized in a direction perpendicular to a polarization direction of the first light.

4. The strain sensor according to claim 2, wherein
   the light source emits the plurality of types of light having the different polarization directions at different times.

5. The strain sensor according to claim 2, wherein
   the light source comprises a plurality of light sources; and
   the plurality of light sources emit the plurality of types of light having the different polarization directions.

6. The strain sensor according to claim 2, wherein
   the signal processor calculates the strain amount based on table data indicating a correspondence relation between the light intensity and the strain amount, the table data being prepared for each of the polarization directions.

7. The strain sensor according to claim 1, wherein the signal processor calculates the strain amount based on table data indicating a correspondence relation between the light intensity and the strain amount.

8. The strain sensor according to claim 1, wherein each of areas for the second medium has a shape of a perfect circle in a planar view, the perfect circle having a central axis extending in a direction perpendicular to the mounting surface.

9. The strain sensor according to claim 1, wherein the areas for the second medium contain gas.

10. The strain sensor according to claim 1, wherein
the light source and the detector are disposed adjacent to each other; and
the light source emits the light in a direction substantially perpendicular to the mounting surface.

11. The strain sensor according to claim 1, wherein each of the marker and the measuring object comprises transparent substance; and
the detector detects a spectral intensity of the light transmitted through the marker.

12. The strain sensor according to claim 1, further comprising a temperature measurement section which measures temperatures of the marker and the measuring object, wherein
the signal processor calculates Young's moduli of the marker and the measuring object based on the temperatures measured by the temperature measurement section.

13. The strain sensor according to claim 1, wherein the light source emits a light beam having a wavelength of 1 μm or less.

14. A method of measuring the strain amount using the strain sensor according to claim 1, the method comprising calculating the strain amount based on the light intensity detected by the detector.

* * * * *